(12) United States Patent
Amano

(10) Patent No.: US 7,429,050 B2
(45) Date of Patent: Sep. 30, 2008

(54) HEIGHT ADJUSTING SYSTEM FOR AUTOMOTIVE VEHICLE

(75) Inventor: Yoshiharu Amano, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 430 days.

(21) Appl. No.: 11/219,711

(22) Filed: Sep. 7, 2005

(65) Prior Publication Data

US 2006/0055129 A1     Mar. 16, 2006

(30) Foreign Application Priority Data

Sep. 14, 2004   (JP)   ............... 2004-266194

(51) Int. Cl.
*B60G 17/005*   (2006.01)
(52) U.S. Cl. .................................. 280/5.507
(58) Field of Classification Search ............. 280/5.507, 280/5.508, 5.509, 124.157
See application file for complete search history.

(56) References Cited

U.S. PATENT DOCUMENTS 6,161,845 A   12/2000   Shono et al.

FOREIGN PATENT DOCUMENTS

| DE | 19847106 A1 | 4/1999 |
|---|---|---|
| JP | A 01-233111 | 9/1989 |
| JP | A 05-193325 | 8/1993 |
| JP | A 11-190629 | 7/1999 |
| JP | A 2003-170721 | 6/2003 |

*Primary Examiner*—Faye M. Fleming
(74) *Attorney, Agent, or Firm*—Oliff & Berridge, PLC

(57) ABSTRACT

A system for adjusting a height of an automotive vehicle having four wheels, the system comprising: four height adjusters provided for the respective wheels; and a controller controlling an operation of each height adjuster so as to adjust the vehicle height at each of four positions corresponding to the wheels, the controller including: an initial control portion controlling the operation of at least one of the height adjusters such that the vehicle height is initially changed at at least two of the four positions, in a first direction which is one of an upward direction and a downward direction, and then in a second direction which is the other direction; and a final control portion controlling the operation of all the height adjusters after the control by the initial control portion, such that the vehicle height is changed at all the four positions to respective target levels.

9 Claims, 4 Drawing Sheets

HEIGHT ADJUSTING SYSTEM FOR AUTOMOTIVE VEHICLE

INCORPORATION BY REFERENCE

The present application is based on Japanese Patent Application No. 2004-266194, filed on Sep. 14, 2004, the content of which is incorporated herein by reference.

BACKGROUND OF THE INVENTION

1. Field of the Invention

The invention relates to annunciation of an initiation of a height adjustment of an automotive vehicle.

2. Description of the Related Art

Each of the following publications discloses a system for adjusting a vehicle level or height: JP-A-5-193325, JP-A-2003-170721, JP-A-11-190629, and JP-A-1-233111. In the first one, i.e., JP-A-5-193325, is disclosed a technique in which an initiation of a height adjustment is announced by sounding a buzzer and otherwise.

SUMMARY OF THE INVENTION

It is an object of the invention to enable to announce an initiation of an adjustment of a vehicle height with enhanced reliability.

The present invention provides a system for adjusting a height of an automotive vehicle having a front-right wheel, a front-left wheel, a rear-right wheel, and a rear-left wheel, the system comprising:

four height adjusters provided for the respective wheels; and a controller for controlling an operation of each of the four height adjusters so as to adjust the vehicle height at each of four positions corresponding to the four wheels, the controller including:

an initial control portion which controls the operation of at least one of the four height adjusters such that the vehicle height is initially changed at at least two of the four positions, in a first direction which is one of an upward direction and a downward direction, and then in a second direction which is the other of the upward and downward directions; and a final control portion which controls the operation of all of the height adjusters after the operation of the at least one height adjuster is controlled by the initial control portion, such that the vehicle height is changed at all of the four positions to respective target levels.

The height adjuster is provided, often together with a suspension spring, for each of the front-right (FR), front-left (FL), rear-right (RR), and rear-left (RL) wheels. An operation of each height adjuster is controlled by the controller such that the vehicle height is controllable independently at each of the four positions corresponding to the four wheels.

Upon initiation of an adjustment of the vehicle height, at least one of the four height adjusters is operated in a controlled manner. That is, first, the vehicle height is changed at at least two of the four positions, in a first direction, then in a second direction opposite to the first direction. For instance, the vehicle height is first lowered and then increased, or first increased and then lowered, at each of at least two of the four positions.

In this way, by controlling the operation of at least one of the height adjusters, a body of the vehicle is vertically moved. The vertical movement of the vehicle body is made in one of the following three ways, in terms of an average height and an attitude of the vehicle: (i) both of the average height and attitude are changed; (ii) the attitude is changed but the average height is not changed; and (iii) the average height is changed but the attitude is not changed. Each of these movements is visually recognizable so that a person outside and around the vehicle is informed of the initiation of the vehicle height adjustment. Meanwhile, according to a technique where an initiation of a vehicle height adjustment is announced by buzzer sound, as disclosed in the above-mentioned publication JP-A-5-193325, it is ambiguous what the buzzer sound intends to announce. Further, where the vehicle height is adjusted in a noisy environment, the buzzer sound may not be heard. This problem can be solved by raising the volume of the buzzer sound, but this solution leads to an offense to the ear. On the other hand, the present invention where the announcement of initiation of the height adjustment is visually made is free from such a drawback, while enhancing the reliability in the announcement of the initiation of the height adjustment to a person outside and around the vehicle. Further, since the buzzer or the like is not essential for the system of the present invention to announce the initiation of the adjustment, the number of components can be reduced.

In an initial phase of the height adjustment (which may be referred to as "the initial control" hereinafter), the vehicle height is controlled by the initial control portion of the controller. In the initial control, the operation of at least one of the four height adjusters is controlled, so as to change the vehicle height at at least two of the four positions either in a same direction or in different directions between the at least two positions. The amount by which the vehicle height is changed may or may not be the same between the at least two positions.

Thus, the number of height adjusters whose operation is controlled by the initial control portion of the controller, and the number of positions where the vehicle height is changed are not necessarily the same. The first and second directions, which are opposite to each other, may or may not be the same among all the wheels. That is, the first direction for a wheel may be the second direction for another wheel.

For instance, where the operation of all of the four height adjusters for the respective wheels FR, FL, RR, RL is controlled by the initial control portion in a same manner, that is, where the direction and the amount of the height change are identical among the four positions corresponding to the wheels, the attitude of the vehicle is not changed but the average height of the vehicle is changed. In this case, a substantially parallel displacement of the vehicle body is made in a vertical direction, that is, the vehicle body is substantially translated vertically. The vertical, parallel displacement of the vehicle body is made by controlling the operation of two height adjusters for two wheels positioned in diagonal relationship.

In a case where the operation of two height adjusters for the two front wheels, i.e., front-right and front-left wheels FR, FL, is controlled in a same manner, or where the operation of two height adjusters for the two rear wheels, i.e., rear-right and rear-left wheels RR, RL, is controlled in a same manner, the vehicle height at the positions corresponding to the front wheels, or the rear wheels, is first changed in the first direction and then in the second direction. Accordingly, the vehicle body first leans forward or backward, and then returns to an original attitude or position of the vehicle body.

On the other hand, in a case where the operation of one height adjuster for one of the two front wheels is controlled, the vehicle height is changed at two positions corresponding to both of the two front wheels, in a same direction. Similarly, where the operation of one height adjuster for one of the two rear wheels is controlled, the vehicle height is changed at two positions corresponding to both of the two rear wheels, in a same direction. In these cases too, the vehicle body leans forward or backward, and then returns to its original attitude.

The initial control portion may control the operation of the height adjusters for the front wheels to lower the vehicle height thereat, and control the operation of the height adjusters for the rear wheels to increase the vehicle height thereat. Where such a control is made, the vehicle body leans forward and then returns to its original attitude, and when an amount of the lowering in the vehicle height at the front wheels and an amount of the increase in the vehicle height at the rear wheels are the same, the average vehicle height is not changed. Similarly, the initial control portion may control the operation of the height adjusters for the front wheels to increase the vehicle height thereat, and control the operation of the height adjusters for the rear wheels to lower the vehicle height thereat. Where such a control is made, the vehicle body leans backward and then returns to its original attitude. In this case, too, when an amount of the increase in the vehicle height at the positions of the front wheels and an amount of the lowering in the vehicle height at the positions of the rear wheels are the same, the average vehicle height is not changed.

The initiation of the vehicle height adjustment is thus announced by the vertical displacement of the vehicle body, and then the vehicle height is adjusted to the target level in a final phase of the vehicle height adjustment, namely, the final control following the initial control. The adjustment or change of the vehicle height to the target level is either in the first direction or in the second direction. In the case where the change to the target level in the final control is in the first direction while the initial control is such that the vehicle height is first changed in the first direction and then in the second direction, the change in the vehicle height in the first direction in the initial control, which will be referred to as a first change in the initial control, can be considered to be an announcing movement, and the change in the vehicle height in the second direction, which will be referred to as a second change in the initial control, can be considered to be a standby movement. Alternatively, a combination of the first and second changes may be considered to be an announcing movement. However, it is not essential that the direction in which the vehicle height is changed to the target level in the final control, is identical with the direction of the first change, namely, the first direction in which the vehicle height is first changed in the initial control. In other words, the direction in which the vehicle height is changed to the target level in the final control may be identical with the direction of the second change, namely, the second direction in which the vehicle height has been changed as the second change in the initial control, after the change in the first direction.

As seen from the above description, the final control portion may be referred to as a main control portion, while the initial control portion may be referred to as a preliminary control portion since the initial control portion is implemented before the main control in which the vehicle height is conclusively adjusted to the target level.

The initial and final controls may be implemented continuously without intermission. Alternatively, the final control may be implemented when a predetermined time has lapsed after the moment of termination of the initial control. Further, in the initial control, the first and second changes may be implemented continuously without intermission. Alternatively, the second change may be implemented when a predetermined time has lapsed after the moment of termination of the first change, in other words, after a suspension of the adjustment for a predetermined period of time.

The amount of change may or may not be the same between the first change and the second change. Hereinafter, the amount of change for the first change and the second change may be referred to as "a first variation" and "a second variation", respectively. Where the height change to the target level in the final control is in the first direction, it is desirable that the second variation is smaller than the first variation, so as to reduce the amount of displacement of the vehicle body in the initial control as well as to reduce the time taken for the final control. For the same reasons, where the height change to the target level in the final control is in the second direction, the second variation may be larger than the first variation. In the case where the first and second variations are identical, at the termination of the initial control, the average height and the attitude of the vehicle are returned to their original level and state which are established before the initial control, and thereafter the height adjustment to the target level is implemented.

The first and second variations are desirably smaller than a difference between the target level and the original level before the initiation of the adjustment. When the first variation and second variation are relatively large, the initial control takes a longer time than when the first and second variations are relatively small, resulting in an increase in the time taken for an entire process of the height adjustment. On the other hand, the first and second variations excessively small make it difficult to visually recognize the vertical movement of the vehicle body. Hence, it is desirable that the first and second variations are determined in view of these conditions, and may take the form of predetermined constant values or alternatively determined each time the vehicle height adjustment is made. In either case, it is desirable that the vehicle body is displaced in the vertical direction in an amount which makes it possible to visually recognize the displacement.

This object may be achieved according to any one of the following modes of the present invention in the form of a vehicle height adjusting system and a method of adjusting a vehicle height, each of which is numbered like the appended claims and depends from the other mode or modes, where appropriate, for easier understanding of technical features disclosed in the present application and possible combinations of those features. However, it is to be understood that the invention is not limited to those technical features or combinations thereof. That is, the invention should be construed in view of the illustration following the respective modes as well as the description of the preferred embodiments of the invention below, and as long as such a construction is made, any one of a plurality of technical features described below with respect to any one mode of the invention may be a subject matter of the present invention, without the other technical feature or features being combined with that one technical feature, and any feature may be implemented with another feature or features.

(1) A system for adjusting a height of an automotive vehicle having a front-right wheel, a front-left wheel, a rear-right wheel, and a rear-left wheel, the system comprising:

four height adjusters provided for the respective wheels; and a controller for controlling an operation of each of the four height adjusters so as to adjust the vehicle height at each of four positions corresponding to the four wheels, the controller including:

an initial control portion which controls the operation of at least one of the four height adjusters such that the vehicle height is initially changed at at least two of the four positions, in a first direction which is one of an upward direction and a downward direction, and then in a second direction which is the other of the upward and downward directions; and a final control portion which controls the operation of all of the height adjusters after the operation of the at least one height adjuster is controlled by the initial control portion, such that the vehicle height is changed at all of the four positions to respective target levels.

(2) The system according to the mode (1), wherein the initial control portion includes an attitude maintaining portion which controls at least one of two diagonal pairs of the height adjusters concurrently in a same manner such that the vehicle height is lowered and then increased at all of the four positions while an attitude of the vehicle is maintained.

In the system of the above mode (1), the vehicle height is first lowered and then increased. That is, the first direction is downward and the second direction is upward.

The at least one pair, or two, height adjusters are controlled such that the attitude of the vehicle is not changed but the average height of the vehicle is changed. The direction and amount of the height change are the same among all of the four positions corresponding to the wheels of the vehicle. The vehicle attitude is either inclined or substantially horizontal, at the moment of initiation of the initial control of the height adjustment. In either case, the vehicle attitude at the moment of the initiation is maintained throughout the height adjustment.

It is noted that in this specification the words "horizontal attitude", "the vehicle attitude is maintained", and the like merely mean that the purpose of the height adjustment in question is not to change the vehicle attitude, and it dose not matter whether the vehicle attitude is actually changed or not.

(3) The system according to the mode (1), wherein the initial control portion includes an attitude changing portion which controls at least one of the height adjusters concurrently such that the vehicle height is lowered and then increased at two of the four positions which are not in diagonal relationship.

In the system of mode (3), the vehicle height is first lowered and then increased, at two positions corresponding to two of the four wheels, which may be the two front wheels (i.e., the front-right and front-left wheels), two rear wheels (i.e., the rear-right and rear-left wheels), two right wheels (i.e., the front-right and rear-right wheels), or two left wheels (i.e., the front-left and rear-left wheels). In any of these cases, the vehicle body is inclined around a longitudinal or lateral axis of the vehicle, and then returned to an original position or attitude of the vehicle body.

In controlling the operation of at least one height adjuster so that the vehicle body is inclined as described above, conditions such as the position and number of the height adjuster or adjusters to be controlled are determined based on an orientation of the inclination and other parameters.

(4) The system according to any one of the modes (1) to (3), wherein the initial control portion includes a stationary period executing portion which implements the control of the operation of the at least one height adjuster while the vehicle is at rest.

The necessity to announce the initiation of the vehicle height adjustment is relatively low during the vehicle is running, and relatively high when the vehicle is stationary or at rest. Thus, the announcement is made only when the height adjustment is implemented while the vehicle is at rest.

For instance, the height adjustment is implemented in any of the following cases, while the vehicle is at rest: (i) an operating member, which is disposed in a cabin of the vehicle, is operated to instruct to implement the height adjustment; (ii) information instructing to implement the height adjustment is received from an external device; for instance, relevant information is transmitted from a mobile device; and (iii) a predetermined condition for initiating the height adjustment is established. It is often the case with a vehicle whose height is relatively high that a height adjustment to lower the vehicle height is made before a driver or occupant gets in the vehicle, so as to facilitate his/her boarding. This adjustment may be made in response to information received from a mobile device. In this case, it is desirable that the adjustment is made such that in its initial control the vehicle body first leans forward and then returns to its original attitude since such a motion is like a bow for receiving the occupant to get aboard the vehicle.

During the vehicle is at rest, there may be a person or persons outside and around the vehicle, and thus it is undesirable that the vehicle body abruptly moves in a vertical direction by a larger amount. Thus, it is important to announce initiation of a height adjustment to a person or persons outside and around the vehicle.

(5) The system according to any one of the modes (1) to (4), wherein the vehicle further comprises four wheel-side members disposed on the respective wheels, and four body-side members disposed in a body of the vehicle at respective positions corresponding to the wheels, and wherein each of the height adjusters includes a fluid pressure chamber disposed between the wheel-side member and the body-side member, and the controller includes a flow control portion which controls flow of a fluid into and out of each of the fluid pressure chambers.

The fluid may be a liquid or a gas. However, a liquid is advantageous in that the time required to adjust the vehicle height to the target level is relatively short.

The fluid pressure chamber is constituted by an air chamber where the fluid is a gas, and by a pressure chamber of a hydraulic cylinder where the fluid is a liquid.

(6) The system according to any one of the modes (1) to (4), wherein the vehicle further comprises four wheel-side members disposed on the respective wheels, and four body-side members disposed in a body of the vehicle at respective positions corresponding to the wheels, and wherein each of the height adjusters includes a rotary mechanism which rotates the wheel-side member around a horizontal axis with respect to the body-side member.

For instance, a suspension arm as the wheel-side member is rotated by an electric motor with respect to a frame as the body-side member so that a distance between the wheel and the vehicle body is varied to change the vehicle height.

(7) A method of adjusting a height of an automotive vehicle by means of a height adjusting system, the method comprising:

the adjustment being implemented while the vehicle is at rest so as to lower the vehicle height down to a target level;

a first step of lowering the vehicle height by a predetermined amount;

a second step of increasing the vehicle height; and a third step of lowering the vehicle height to the target level.

The term "height of an automotive vehicle" or "vehicle height" in the mode (7) refers to an average height of the vehicle. Hence, according to the mode (7), the average vehicle height is first lowered and then increased. Thereafter, the average vehicle height is again lowered but now to the target level.

The height adjusting system comprises a plurality of height adjusters. It is not essential that height adjusters be respectively provided for all wheels of the vehicle. For instance, a common height adjuster is provided for two front wheels, and for two rear wheels.

(8) The method according to the mode (7), wherein an attitude of the vehicle is maintained throughout the first and second steps.

In the method of the mode (8), the average vehicle height is lowered and then increased, with the attitude of the vehicle body maintained substantially horizontal.

(9) The method according to the mode (7), wherein a body of the vehicle is inclined during at least a part of the first and second steps.

When the vehicle body is inclined, the average vehicle height is changed. During the first to third steps are implemented according to the method of the mode (9), a movement of the vehicle body such that the vehicle body is inclined with the average vehicle height constant is not made.

BRIEF DESCRIPTION OF THE DRAWINGS

The above and other objects, features, advantages and technical and industrial significance of the present invention will be better understood by reading the following detailed description of preferred embodiments of the invention, when considered in connection with the accompanying drawings, in which.

DETAILED DESCRIPTION OF PREFERRED EMBODIMENTS

Hereinafter, there will be described several embodiments of the invention, by referring to the accompanying drawings.

Figure 1:
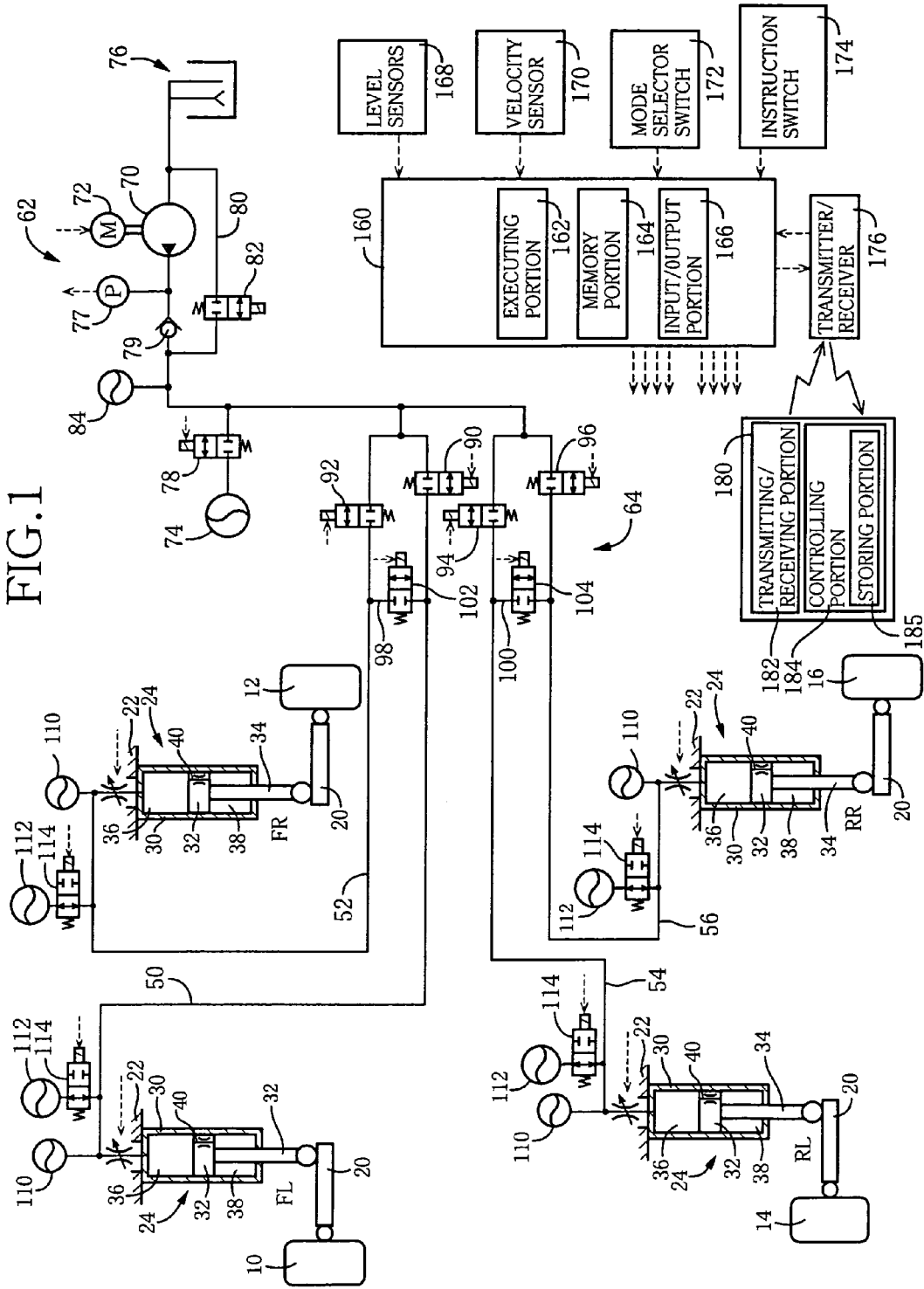
FIG. 1 is a schematic view showing a general structure of a height adjusting system according to one embodiment of the invention.
Figure 2:
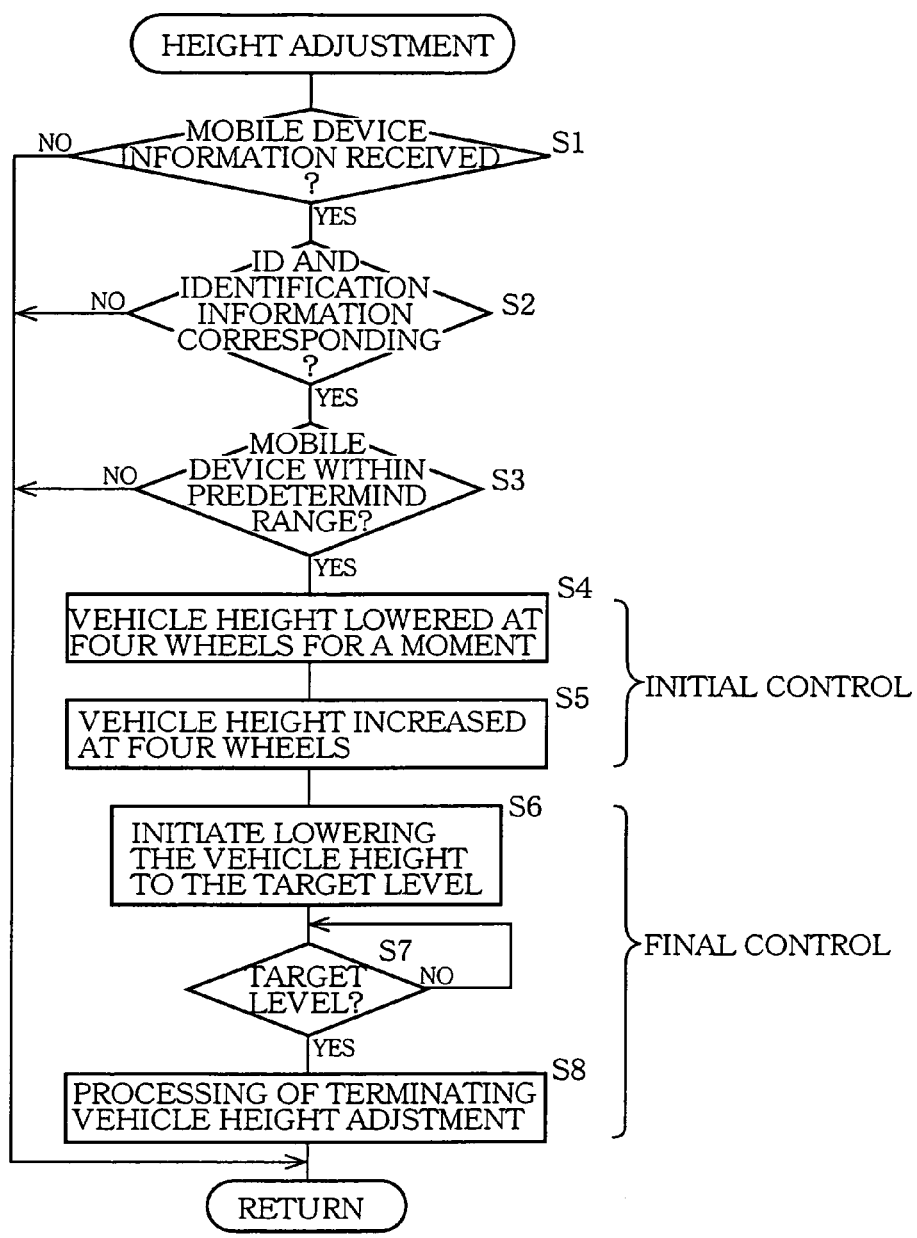
FIG. 2 is a flowchart illustrating a height adjustment program stored in a memory portion of a suspension ECU of the height adjusting system.

Referring to FIGS. 1 and 2, there will be described a height adjusting system for an automotive vehicle according to a first embodiment of the invention.

Referring first to FIG. 1, a suspension cylinder 24 as a height adjuster is provided for each of four wheels of the vehicle. The four wheels are a front-left wheel 10, a front-right wheel 12, a rear-left wheel 14, and a rear-right wheel 16. Each suspension cylinder is disposed, together with a suspension spring (not shown), between a wheel-side member 20 and a body-side member 22 for a wheel. The suspension cylinder 24 comprises a housing 30 and a piston 32 slidably received in the housing 30. The piston 32 divides the inner space of the housing 30 into two parts, namely, fluid chambers 36, 38. Through the piston 32 is formed a communication passage 40 having an orifice and allowing fluid communication between the two fluid chambers 36, 38. The orifice produces, upon displacement of the piston 32 in the housing 30, a damping force corresponding to a velocity of the piston 32. In this embodiment, a shock absorber is used as the suspension cylinder 24.

A fluid source 62 is connected to the hydraulic pressure chambers 36 of the suspension cylinders 24 for the respective wheels 10-16, via respective individual passages 50-56 of a fluid system. In addition, a control valve device 64 is disposed between the fluid source 62 and each suspension cylinder 24 for the wheel 10-16.

The fluid source 62 includes a pump 70, a pump motor 72, an accumulator 74, and others. The pump 70 is driven by the pump motor 72, to suck up a working fluid from a reservoir 76 and discharge the fluid. The fluid discharged from the pump 70 is accumulated in the accumulator 74 in pressurized state. The pump motor 72 is operated only when a height of the vehicle is to be increased. The pump motor 72 is controlled so that the pressure of the accumulator 74 detected by a pressure sensor 77 is kept within a predetermined range. There is disposed a normally-closed high-pressure control valve 78 for the accumulator 74.

A discharge passage 80 connects a point of the fluid system on the high-pressure side of the delivery valve 79 of the pump 70, to the reservoir 76. A discharge control valve 82, which is a normally-closed solenoid valve, is disposed in the discharge passage 80. When the discharge control valve 82 is opened, the fluid in the hydraulic pressure chambers 36 of the suspension cylinders 24 is dischargeable so that the vehicle height is lowered. In FIG. 1, reference numeral 84 denotes an accumulator for noise reduction.

Two accumulators 110, 112 are disposed in each of the individual passages 50-56 for the respective suspension cylinders 24. A spring-constant control valve is provided for each accumulator 112. The spring-constant control valve is a normally-open solenoid valve 114 having a spring whose spring constant is regulated to be relatively large when the control valve is in an open state, and relatively small when the control valve is in a closed state.

In FIG. 1, reference numeral 160 denotes a suspension ECU which is mainly constituted by a computer including an executing portion 162, a memory portion 164, and an input/output portion 166. To the input/output portion 166 are connected four level sensors 168, which are respectively provided for detecting the vehicle height at positions respectively corresponding to the four wheels 10-16, a velocity sensor 170 for detecting a running speed of the vehicle, a mode selector switch 172 for selecting the mode of an adjustment of the vehicle height, an instruction switch 174, and a transmitter/receiver 176. Further, solenoids of the solenoid valves 114, 82 and the pump motor 72 are connected to the input/output portion 166 via respective drive circuits not shown. The transmitter/receiver 176 includes an antenna and others, and makes a communication with a mobile device 180. The memory portion 164 stores programs such as a height adjustment program illustrated in FIG. 2, and an identification number ID.

In most cases, the mobile device 180 is carried by an occupant of the vehicle such as a driver, and thus the mobile device 180 is usually outside the vehicle until the occupant gets in the vehicle. The mobile device 180 includes a transmitting/receiving portion 182 and a controlling portion 184 mainly constituted by a computer and including a storing portion 185 which stores the identification number ID and others. The mobile device 180 transmits a series of information (which may be collectively referred to as "mobile device information" hereinafter) including identification information corresponding to the identification number ID stored in the memory portion 164 of the suspension ECU 160, and adjustment instruction information which instructs the suspension ECU to implement an adjustment of the vehicle height.

On receiving the mobile device information, the suspension ECU 160 implements collation of the identification information. When it is determined that the identification information sent from the mobile device 180 corresponds to the identification number ID stored in the memory portion 164 of the suspension ECU 160, and a predetermined condition, such as entrance of the mobile device 180 into a predetermined range around the vehicle, is satisfied, the adjustment of the vehicle height is initiated.

It is not essential that the mobile device information sent from the mobile device 180 includes the adjustment instruction information, but it may be arranged such that an adjustment of the vehicle height is initiated when the mobile device 180 approaches the vehicle and enters the predetermined range. That is, the entering of the mobile device 180 into the predetermined range is considered to be a request for the adjustment of the vehicle height made. This arrangement is desirable since when the probability that the occupant will get in the vehicle shortly is relatively high, the vehicle height is lowered in advance. The predetermined range is set such that when the height adjustment is initiated at a moment of the entering of the mobile device 180 into the predetermined range, the height adjustment is complete at a moment the mobile device 180 or the occupant carrying the mobile device 180 reaches the vehicle to get therein. For instance, when a given time has elapsed from a moment the mobile device information is received, it is determined that the mobile device 180 enters the predetermined range. Alternatively, depending on the capability of the suspension ECU 160 to receive the mobile device information, the determination that the mobile device 180 enters the predetermined range may be made when the mobile device 180 gets in a coverage area of the suspension ECU 160, within which the mobile device 180 can communicate with the suspension ECU 160. In any case, when the determination that the mobile device 180 enters the predetermined range is made, the height adjustment is initiated.

Referring now to a flowchart of FIG. 2, there will be illustrated the height adjustment program, which is executed in a predetermined cycle.

The flow of the height adjustment begins with step S1 in which it is determined whether the mobile device information is received from the mobile device 180. When an affirmative decision (YES) is obtained, that is, when the mobile device information is received, the flow goes to step S2 to collate the identification information, namely, it is checked whether the identification information included in the mobile device information properly corresponds to the identification number ID stored in the memory portion 164 of the suspension ECU 160. When an affirmative decision (YES) is made, that is, when the identification information and the identification number ID properly correspond to each other, the flow goes to step S3 to determine whether the mobile device 180 is within the predetermined range.

When an affirmative decision (YES) is made, that is, when the mobile device 180 is within the predetermined range, the flow goes to step S4 and the subsequent steps to implement the vehicle height adjustment. In steps S4 and S5, an initial part of the height adjustment, i.e., an initial control, is implemented, and then in steps S6 to S8, a latter part of the height adjustment, i.e., a final control, is implemented.

In the initial control, all of the individual control valves 90-96 respectively corresponding to the wheels 10-16, are opened, and the discharge control valve 82 is also opened, so as to lower the vehicle height at all the positions corresponding to the four wheels 10-16, by a predetermined amount (hereinafter referred to as "the predetermined lowering amount"). The predetermined lowering amount is desirably set such that the downward movement of the vehicle body is visually recognizable.

Then, the vehicle height is increased by a predetermined amount (which will be referred to as "the predetermined increase amount"). In the present embodiment, the predetermined increase amount is smaller than the predetermined lowering amount. The discharge control valve 82 is closed, and the pump motor 72 is operated. By the operation of the pump motor 70, the fluid is discharged from the pump 70 into the suspension cylinders 24 for the wheels 10-16. When the working fluid is accumulated in the accumulator 74, it is possible to supply the fluid to the suspension cylinders 24 from the accumulator 74 by opening the high-pressure control valve 78. However, it is often the case that the working fluid is not accumulated in the accumulator 74. In the latter case, the high-pressure control valve 78 is kept closed.

During the downward and upward movements of the vehicle body, the attitude of the vehicle body is not changed, and an average vehicle height is changed.

In the final control, the individual control valves 90-96 for the wheels 10-16 are opened, and the discharge control valve 82 is also opened, to discharge the fluid from the suspension cylinders 24 for the respective wheels 10-16. When the vehicle height is lowered to a target level, the individual control valves 90-96 are closed, and the discharge control valve 82 is also closed.

In this way, before the final control is initiated, the vehicle height is moved downward and then upward, in order to visually inform a person or persons outside and around the vehicle that an adjustment of the vehicle height is to be initiated. Thus, an initiation of a vehicle height adjustment is informed with enhanced reliability. The movement of the vehicle body to lower the vehicle height in step S4 corresponds to the announcing movement. That is, the vehicle height is first lowered to beforehand announce that the vehicle height is to be lowered in the final control, then the vehicle height is restored, and thereafter the final control to the target level is implemented.

In the present embodiment, a portion of the suspension ECU 160 which stores the height adjustment program of the flowchart shown in FIG. 2, another portion of the suspension ECU 160 which executes the height adjustment program, and others constitute an operating state controller. A portion of the operating state controller which stores and executes tasks of steps S4, S5, and others constitute an initial control portion, while another portion of the operating state controller which stores and executes tasks of steps S6, S7, and others constitute a final control portion. The initial control portion acts as an attitude maintaining portion, too.

In the above-described embodiment, the initial control and the final control are continuously implemented without intermission, and steps S4 and S5 in the initial control are continuously implemented without intermission. However, the adjustment may be implemented otherwise. That is, the final control may be implemented when a predetermined time has elapsed after termination of the initial control, and step S5 may be implemented when a predetermined time has elapsed after termination of step S4. More specifically, as described above, the system of the present embodiment is arranged such that the discharge control valve 82 in its open state is closed and the pump motor 72 is operated and then stopped, and thereafter the discharge control valve 82 is again opened from its closed state, while the individual control valves 90-96 are kept opened throughout. However, the individual control valves 90-96 may be closed when the direction of the movement of the vehicle body is to be shifted, or upon transition from the initial control to the final control, so that the vehicle height at this moment is maintained for a predetermined period of time.

In the above-described embodiment, the lowering and elevating the vehicle body in the initial control are implemented by the predetermined amounts. However, the lowering and elevating the vehicle body in the initial control may be implemented otherwise. For instance, the individual control valves 90-96 and the discharge control valve 82 are kept opened for a predetermined time (i.e., "a predetermined lowering time") to lower the vehicle height, or the pump motor 72 is operated for a predetermined time (i.e., "a predetermined elevating time") to increase the vehicle height. The predetermined lowering time and the predetermined elevating time may or may not be the same. The predetermined lowering and elevating times in a same length does not necessarily mean that the amounts of the lowering and elevation of the vehicle body are the same.

Further, the variation in the vehicle height, which corresponds to the lowering and elevating amounts, for instance, may be determined each time the vehicle height is to be changed, corresponding to a difference between the current height and the target height. The lowering and elevating amounts may be the same.

In the initial control, supply and discharge of the fluid into and out of a pair of suspension cylinders 24 corresponding to the wheels 10, 16 which are positionally in diagonal relationship may be controlled, or supply and discharge of the fluid into and out of the other pair of suspension cylinders 24 corresponding to the wheels 10, 16 which are positionally in diagonal relationship may be controlled. In this way, too, it is possible to change the vehicle height while the current attitude of the vehicle is maintained.

It may be arranged such that each of the times respectively taken for the initial control and the final control is limited so that the time required for a height adjustment as a whole is not excessively long. When such an arrangement is employed, the height adjustment may be terminated before the vehicle height is adjusted to the target level, in some cases.

Figure 3:
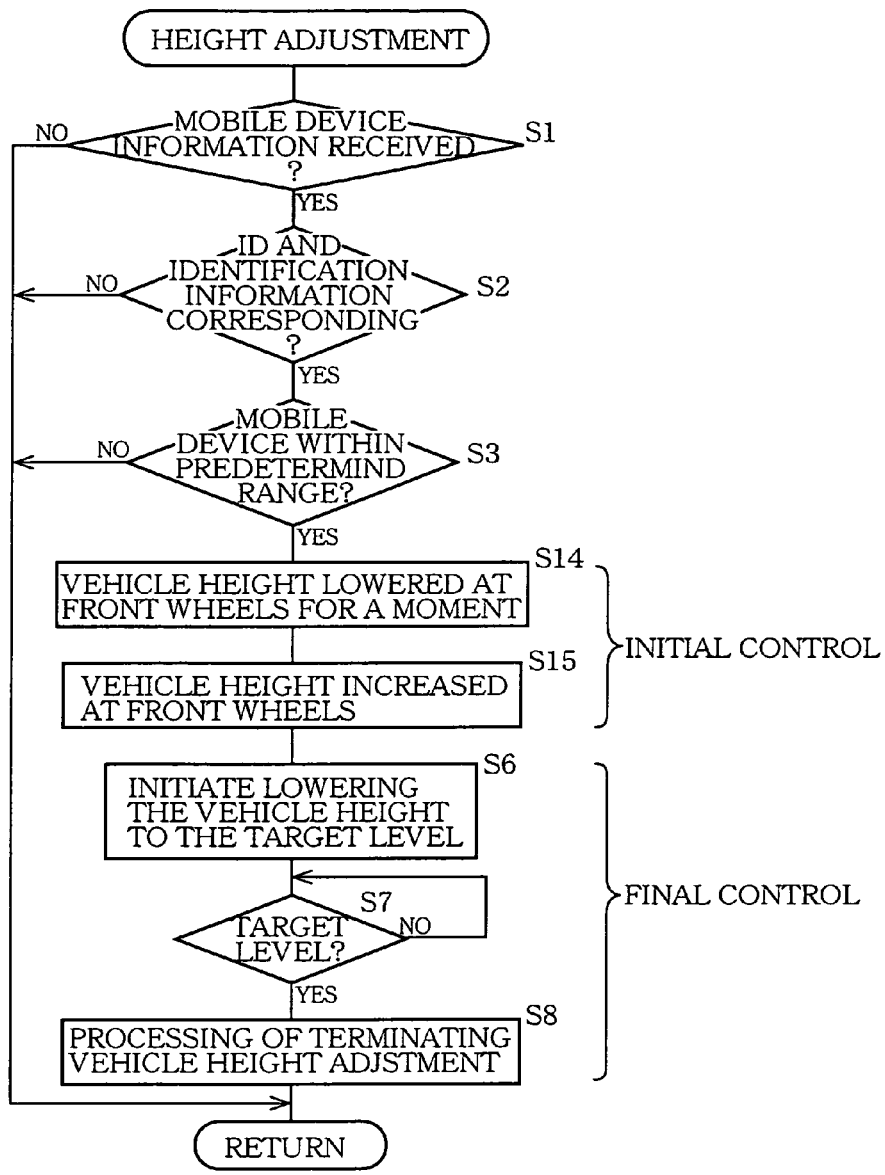
FIG. 3 is a flowchart illustrating a height adjustment program stored in a memory portion in a height adjusting system according to a second embodiment.

There will be now described a height adjusting system according to a second embodiment, by referring to FIG. 3. In this embodiment, a height adjustment program as illustrated in the form of a flowchart as shown in FIG. 3 is executed, and the vehicle body is inclined in the initial control. The same elements or parts as in the first embodiment will be denoted using the same reference numerals and detailed description thereof is dispensed with.

The flow of the height adjustment begins with step S14 in which the individual control valves 90, 92 for the front-left and front-right wheels 10, 12 are opened and the discharge control valve 82 is opened, while the individual control valves 94, 96 for the rear-left and rear-right wheels 14, 16 are kept closed. The flow then goes to step S15 in which the fluid discharged from the pump 70 by operation of the pump motor 72 is supplied into the suspension cylinders 24 for the front-left and front-right wheels 10, 12 so that the vehicle height is increased. The vehicle body leans forward and then returns to its original attitude, thus making a position change like a bow.

By making this position change, it is announced that an adjustment of the vehicle height is to be initiated. In this embodiment, a portion of the suspension ECU 160 which stores and executes steps S14, S15, and others constitute an attitude changing portion as a portion for implementing the initial control.

Figure 4:
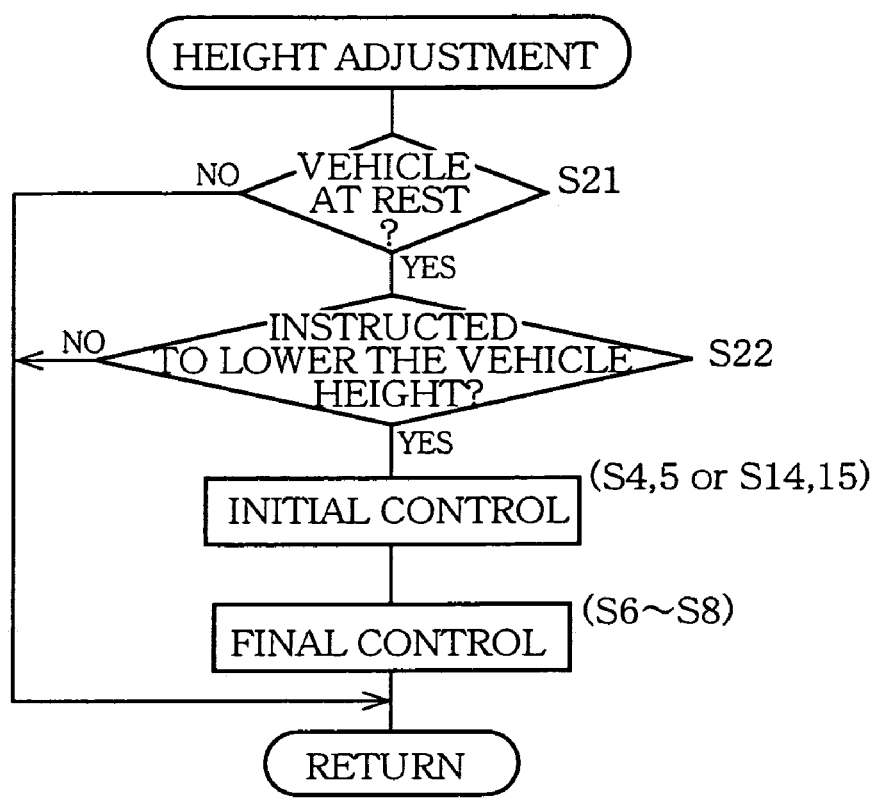
FIG. 4 is a flowchart illustrating a height adjustment program stored in a memory portion in a height adjusting system according to a third embodiment.

There will be now described a height adjusting system according to a third embodiment of the invention, by referring to FIG. 4. The same elements or parts as in the first embodiment will be denoted using the same reference numerals and detailed description thereof is dispensed with.

In each of the above-described embodiments, the vehicle height adjustment is made in response to the information from the mobile device 180. However, according to the third embodiment, the vehicle height adjustment is made in response to other information, namely, the operating state of an instruction switch 174. That is, the vehicle height adjustment is made in response to a request from an occupant. The vehicle height adjustment according to the third embodiment may be such that an initial control is first implemented and then a final control is implemented, in the same manner as in the first and second embodiments.

FIG. 4 is a flowchart illustrating a height adjustment program executed by a suspension ECU of the height adjusting system in a predetermined cycle.

The flow begins with step S21 in which it is determined whether the vehicle is at rest or not. More specifically, the vehicle velocity detected by a velocity sensor 170 is compared with a threshold value. When the detected velocity is not higher than the threshold, the vehicle can be considered to be at rest, and thus an affirmative decision is made in step S21. In this case, the flow goes to step S22 to determine whether the instruction switch 174 is placed in a state instructing to lower the vehicle height, that is, whether the operating state of the instruction switch 174 is DOWN. When an affirmative decision (YES) is made in step S22, that is, when the instruction switch 174 is in the state instructing to lower the vehicle height, the initial control and the final control are implemented in this order.

In some cases, it is desirable to announce the initiation of vehicle height adjustment to a person or persons outside and around the vehicle, even when the person making the instruction to implement the vehicle height adjustment is in the vehicle. According to this embodiment, it is enabled to announce the initiation of vehicle height adjustment even in such cases, with reliability.

In each of the above-described embodiments, it is possible to apply the present invention to a case where a vehicle height adjustment is automatically implemented in accordance with a height adjustment mode as selected. That is, where a condition for implementing a vehicle height adjustment is satisfied during the vehicle is at rest, an initial control and a final control are implemented in the same way as in the above-described embodiments. It is important, in this case also, to announce a person or persons outside and around the vehicle that the vehicle height is to be lowered by the vehicle height adjustment.

The height adjusting system of the second embodiment may be adapted such that the individual control valves 90, 94 for the front-left and rear-left wheels 10, 14 are controlled in a same way, and the individual control valves 92, 96 for the front-right and rear-right wheels 12, 16 are commonly in a same way. In this adapted arrangement, the vehicle body is inclined around a longitudinal axis of the vehicle.

The height adjusting system of the second embodiment may be adapted such that an individual control valve for only one of the front wheels 10, 12, or only one of the rear wheels 14, 16, is controlled. In this adapted arrangement, the vehicle height at the other of the front or rear wheels is also changed correspondingly, resulting in that the vehicle height is changed at both of the front wheels or at both of the rear wheels.

The height adjusting system of the second embodiment may be adapted such that at least one of the suspension cylinders for the rear-left and rear-right wheels 14, 16 is controlled with respect to the supply and discharge of the fluid. In this case, the vehicle body leans backward, and then returns to its original attitude.

In each of the above-described embodiments, the initial control is implemented in the vehicle height adjustment where the vehicle height is ultimately lowered. However, the initial control may be implemented in the same way as in the above-described embodiments when the vehicle height is ultimately increased.

In each of the embodiments, the suspension cylinders are provided as height adjusters, and operated by supply and discharge of the fluid. However, the suspension cylinders may be replaced by suspension cylinders including an air chamber and operated by supply and discharge of air. Further, each of the suspension cylinders may have a mechanism for changing the relative position of the wheel-side member to the body-side member by operation of an electric motor or otherwise.

It is to be understood that the invention is not limited to the details of the above-described embodiments, but may be embodied with various modifications and improvements that may occur to those skilled in the art.

What is claimed is:

1. A system for adjusting a height of an automotive vehicle having four wheels consisting of a front-right wheel, a front-left wheel, a rear-right wheel, and a rear-left wheel, the system comprising:
    four height adjusters provided for the four wheels respectively; and
    a controller for controlling, based on each of respective target levels corresponding to four positions corresponding to the four wheels, an operation of a corresponding one of the four height adjusters so as to adjust the vehicle height at a corresponding one of the four positions corresponding to the four wheels,
    the controller including:
        an initial control portion which controls, based on a single adjustment request, the operation of at least one of the four height adjusters such that the vehicle height is initially changed at at least two of the four positions, in a first direction which is one of an upward direction and a downward direction, and then in a second direction which is the other of the upward and downward directions; and
        a final control portion which controls, after the operation of the at least one height adjuster is controlled by the initial control portion, the respective operations of all of the four height adjusters, such that the vehicle height is changed at all of the four positions to the respective target levels.

2. The system according to claim 1, wherein the initial control portion includes an attitude maintaining portion which controls at least one of two diagonal pairs of the height adjusters concurrently in a same manner such that the vehicle height is lowered, and then increased, at all of the four positions while an attitude of the vehicle is maintained.

3. The system according to claim 1, wherein the initial control portion includes an attitude changing portion which controls at least one of the height adjusters such that the vehicle height is lowered, and then increased, at two of the four positions which are not in a diagonal relationship.

4. The system according to claim 1, wherein the initial control portion includes a stationary period executing portion which implements the control of the operation of the at least one height adjuster while the vehicle is at rest.

5. The system according to claim 1,
    wherein the vehicle further comprises four wheel-side members disposed on respective sides of the four wheels, and four body-side members disposed on a side of a body of the vehicle at respective positions corresponding to the four wheels, and
    wherein each of the height adjusters includes a fluid pressure chamber disposed between a corresponding one of the wheel-side members and a corresponding one of the body-side members, and the controller includes a flow control portion which controls flow of a fluid into, and out of, each of the fluid pressure chambers.

6. The system according to claim 1,
    wherein the vehicle further comprises four wheel-side members disposed on respective sides of the four wheels, and four body-side members disposed on a side of a body of the vehicle at respective positions corresponding to the four wheels, and
    wherein each of the height adjusters includes a rotary mechanism which rotates a corresponding one of the wheel-side members around a horizontal axis with respect to a corresponding one of the body-side members.

7. A method of adjusting a height of an automotive vehicle by means of a height adjusting system thereof while the vehicle is at rest, so that the vehicle height is lowered to a target level, the method comprising:
    a first step of lowering, based on a single adjustment request, the vehicle height by a predetermined amount;
    a second step of increasing, after the first step, the vehicle height; and
    a third step of lowering, after the second step, the vehicle height to the target level.

8. The method according to claim 7, wherein an attitude of the vehicle is maintained throughout the first and second steps.

9. The method according to claim 7, wherein a body of the vehicle is inclined during at least a part of the first and second steps.

* * * * *